US009686719B2

(12) United States Patent
Jafarian

(10) Patent No.: US 9,686,719 B2
(45) Date of Patent: Jun. 20, 2017

(54) BEACON INDICATION TARGET WAKEUP TIME (TWT)

(71) Applicant: QUALCOMM Incorporated, San Diego, CA (US)

(72) Inventor: Amin Jafarian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 14/293,344

(22) Filed: Jun. 2, 2014

(65) Prior Publication Data

US 2014/0355434 A1    Dec. 4, 2014

Related U.S. Application Data

(60) Provisional application No. 61/830,535, filed on Jun. 3, 2013.

(51) Int. Cl.
| | | |
|---|---|---|
| *H04W 4/00* | (2009.01) | |
| *H04W 28/12* | (2009.01) | |
| *H04W 74/00* | (2009.01) | |
| *H04W 74/08* | (2009.01) | |
| *H04W 72/12* | (2009.01) | |
| *H04W 84/04* | (2009.01) | |
| *H04W 48/12* | (2009.01) | |
| *H04W 84/12* | (2009.01) | |
| *H04W 28/16* | (2009.01) | |

(52) U.S. Cl.
CPC ......... *H04W 28/12* (2013.01); *H04W 74/002* (2013.01); *H04W 74/0816* (2013.01); *H04W 28/16* (2013.01); *H04W 48/12* (2013.01); *H04W 72/12* (2013.01); *H04W 84/047* (2013.01); *H04W 84/12* (2013.01)

(58) Field of Classification Search
USPC ........................................................ 370/230
See application file for complete search history.

(56) References Cited

U.S. PATENT DOCUMENTS

| | | | |
|---|---|---|---|
| 2005/0135284 A1* | 6/2005 | Nanda | H04L 29/06068 370/294 |
| 2006/0098592 A1* | 5/2006 | Proctor, Jr. | H04B 7/026 370/315 |

(Continued)

FOREIGN PATENT DOCUMENTS

WO    WO-9908464 A1    2/1999

OTHER PUBLICATIONS

International Search Report and Written Opinion—PCT/US2014/040624—ISA/EPO—Sep. 3, 2014.

(Continued)

*Primary Examiner* — Farah Faroul
(74) *Attorney, Agent, or Firm* — Patterson & Sheridan

(57) ABSTRACT

Certain aspects of the present disclosure provide methods and apparatus for a relay to indicate a transmission interval it wishes to be protected by a restricted access window (RAW) restricting transmission by other devices. An apparatus for wireless communications is provided herein. The apparatus generally includes a processing system that is configured to identify a transmission interval. The apparatus also includes a transmitter that is configured to transmit a request requesting a wireless node to establish a RAW for restricting network traffic during the transmission interval.

30 Claims, 6 Drawing Sheets

(56) References Cited

U.S. PATENT DOCUMENTS

| | | | |
|---|---|---|---|
| 2013/0077610 A1* | 3/2013 | Amini | H04W 52/0216 370/338 |
| 2013/0121160 A1 | 5/2013 | Chung et al. | |
| 2013/0128798 A1 | 5/2013 | Liu | |
| 2013/0195036 A1* | 8/2013 | Quan | H04W 72/04 370/329 |
| 2014/0098725 A1* | 4/2014 | Yucek | H04W 52/0229 370/311 |
| 2014/0112225 A1* | 4/2014 | Jafarian | H04W 52/0235 370/311 |
| 2014/0133393 A1* | 5/2014 | Ghosh | H04W 8/26 370/328 |
| 2014/0192716 A1* | 7/2014 | Pantelidou | H04W 28/02 370/328 |
| 2014/0198723 A1* | 7/2014 | Gong | H04W 74/006 370/328 |
| 2014/0245325 A1* | 8/2014 | Blackman | G06F 9/546 719/314 |
| 2014/0328313 A1* | 11/2014 | Merlin | H04B 7/2621 370/330 |
| 2014/0341234 A1* | 11/2014 | Asterjadhi | H04L 69/324 370/474 |
| 2015/0029922 A1* | 1/2015 | Zheng | H04W 52/0216 370/311 |
| 2015/0359008 A1* | 12/2015 | Wang | H04W 74/004 370/330 |
| 2015/0382283 A1* | 12/2015 | Wang | H04W 52/0216 370/328 |
| 2016/0066198 A1* | 3/2016 | Wang | H04W 16/28 370/338 |

OTHER PUBLICATIONS

Jafarian, A (QUALCOMM): "Enabling AP sleep; 11-13-0070-01-00ah-enabling-ap-sleep", IEEE SA Mentor; 11-13-0070-01-00AH-Enabling-AP-Sleep, IEEE-SA Mentor, Piscataway, NJ USA, vol. 802.11ah, No. 1, Jan. 15, 2013 (Jan. 15, 2013), pp. 1-11, XP068040468, [retrieved on Jan. 15, 2013] the whole document.

Fischer M, "TargetWakeTime," IEEE 802.11-12/0823r0, IEEE, URL:https://mentor.ieee.org/802.11/dcn/12/11-12-0823-00-00ah targetwaketime.pptx, Jul. 12, 2012.

Ghosh C, "TWT Grouping and Assignment for Z-Class STAs," IEEE 802.11-13/0079r0, IEEE, URL:https://mentor.ieee.org/802.11/dcn/13/11-13 0079-00-00ah-twt-grouping-and-assignment-for-z-class-stas. pptx, Jan. 14, 2013, 9 pages.

* cited by examiner

BEACON INDICATION TARGET WAKEUP TIME (TWT)

CROSS-REFERENCE TO RELATED APPLICATIONS

The present Application for Patent claims priority to U.S. Provisional Application No. 61/830,535, filed Jun. 3, 2013, which is assigned to the assignee of the present application and hereby expressly incorporated by reference herein in its entirety.

BACKGROUND

Field of the Invention

Certain aspects of the present disclosure generally relate to wireless communications and, more particularly, to indicating transmission time intervals (e.g., beacon transmission intervals) in a wireless system, such as a wireless system utilizing relays.

Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications, said apparatus wireless communicatively coupled to a wireless node. The apparatus generally includes a processing system configured to identify a transmission interval during which transmissions from the apparatus are in need of protection from transmissions from other wireless devices (e.g., whose transmissions would overlap) and a transmitter configured to transmit a request for a parent node to establish a restricted access window (RAW) for restricting network traffic during the transmission interval.

Certain aspects of the present disclosure provide an apparatus for wireless communications. The apparatus generally includes a receiver configured to receive a request from a first wireless device to establish a restricted access window (RAW) to restrict network traffic during a transmission interval of the first wireless device and a transmitter configured to transmit an indication of the RAW to at least a second wireless device.

Certain aspects of the present disclosure provide an apparatus for wireless communications, said apparatus wireless communicatively coupled to a wireless node. The apparatus generally includes means for identifying a transmission interval during which transmissions from the apparatus are in need of protection from transmissions from other wireless devices and means for transmitting a request for a parent node to establish a restricted access window (RAW) to restrict network traffic during the transmission interval.

Certain aspects of the present disclosure provide an apparatus for wireless communications. The apparatus generally includes means for receiving a request from a first wireless device to establish a restricted access window (RAW) to restrict network traffic during a transmission interval of the first wireless device and means for transmitting an indication of the RAW to at least a second wireless device.

Certain aspects of the present disclosure provide a method for wireless communications by an apparatus, said apparatus wireless communicatively coupled to a wireless node. The method generally includes identifying a transmission interval during which transmissions from the apparatus are in need of protection from transmissions from other wireless devices and transmitting a request for a parent node to establish a restricted access window (RAW) to restrict network traffic during the transmission interval.

Certain aspects of the present disclosure provide a method for wireless communications. The apparatus generally includes means for receiving a request from a first wireless device to establish a restricted access window (RAW) to restrict network traffic during a transmission interval of the first wireless device and means for transmitting an indication of the RAW to at least a second wireless device.

Certain aspects of the present disclosure provide a computer program product for wireless communications by an apparatus, said apparatus wireless communicatively coupled to a wireless node, comprising a computer readable storage medium having instructions stored thereon. The instructions generally include instructions for identifying a transmission interval during which transmissions from the apparatus are in need of protection from transmissions from other wireless devices and transmitting a request for a parent node to establish a restricted access window (RAW) to restrict network traffic during the transmission interval.

Certain aspects of the present disclosure provide a computer program product for wireless communications by an apparatus, comprising a computer readable storage medium having instructions stored thereon. The instructions generally include instructions for receiving a request from a first wireless device to establish a restricted access window (RAW) to restrict network traffic during a transmission interval of the first wireless device and transmitting an indication of the RAW to at least a second wireless device.

Certain aspects of the present disclosure provide a station communicatively coupled to a wireless node. The station generally includes at least one antenna, a processing system configured to identify a transmission interval during which transmissions from the apparatus are in need of protection from transmissions from other wireless devices and a transmitter configured to transmit, via the at least one antenna, a request for a parent node to establish a restricted access window (RAW) to restrict network traffic during the transmission interval.

Certain aspects of the present disclosure provide an access point. The access point generally includes at least one antenna, a receiver configured to receive a request from a first wireless device to establish a restricted access window (RAW) to restrict network traffic during a transmission interval of the first wireless device and a transmitter configured to transmit, via the at least one antenna, an indication of the RAW to at least a second wireless device.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
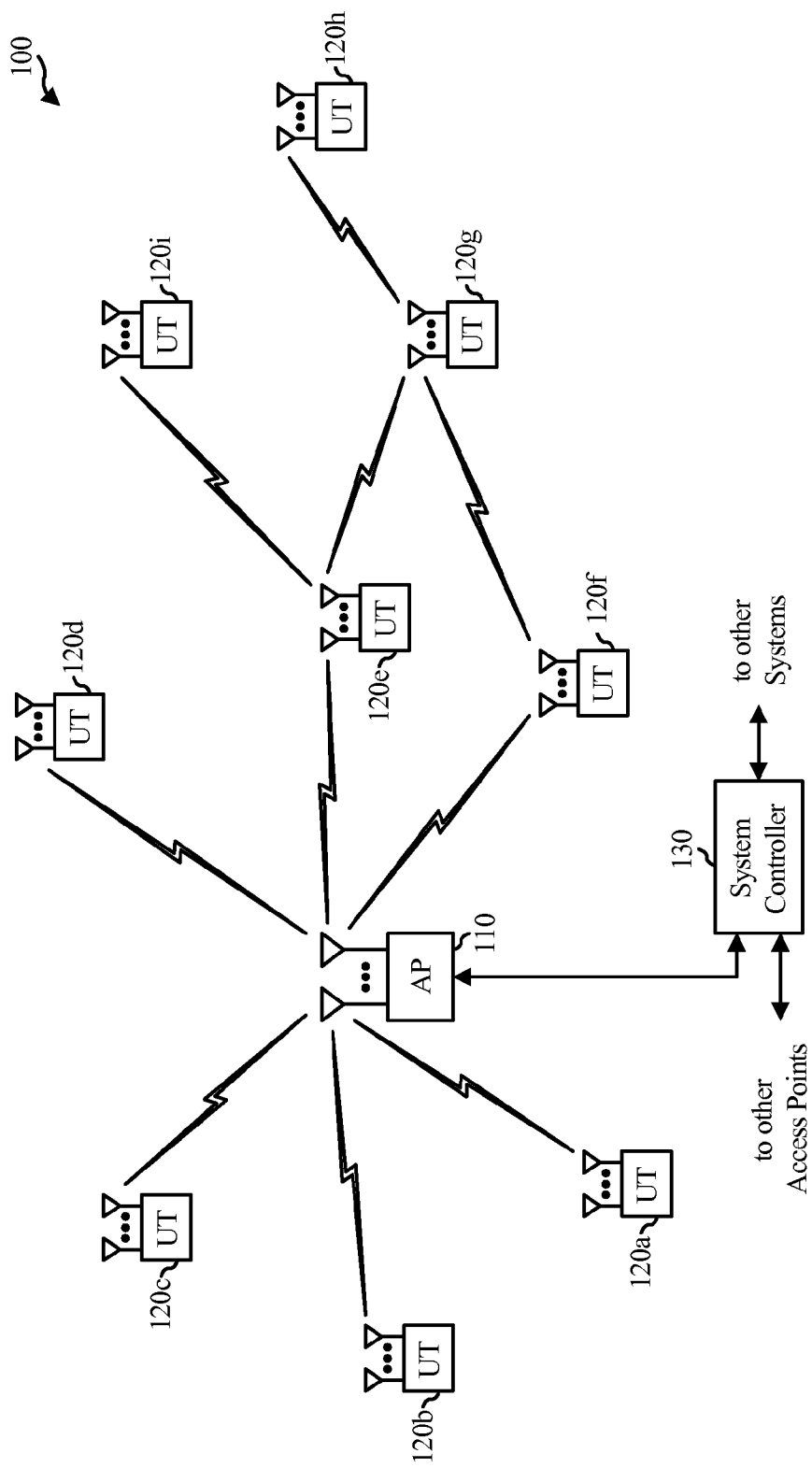
FIG. 1 illustrates a diagram of an example wireless communications network, in accordance with certain aspects of the present disclosure.

Aspects of the present disclosure provide techniques that may help protect transmitted beacons, from interfering transmissions from other devices, by avoiding the scheduling of beacon transmission time intervals that overlap.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
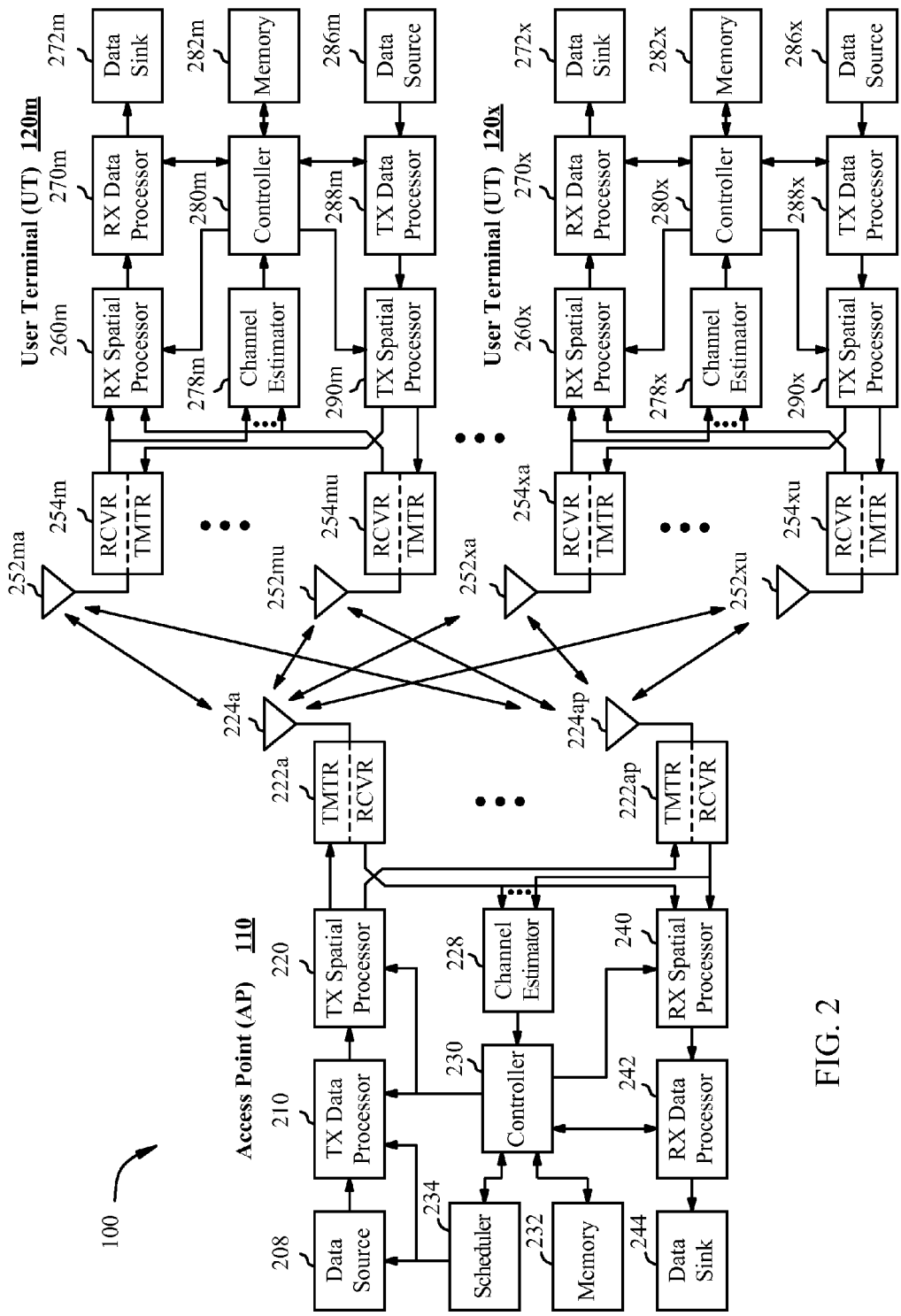
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
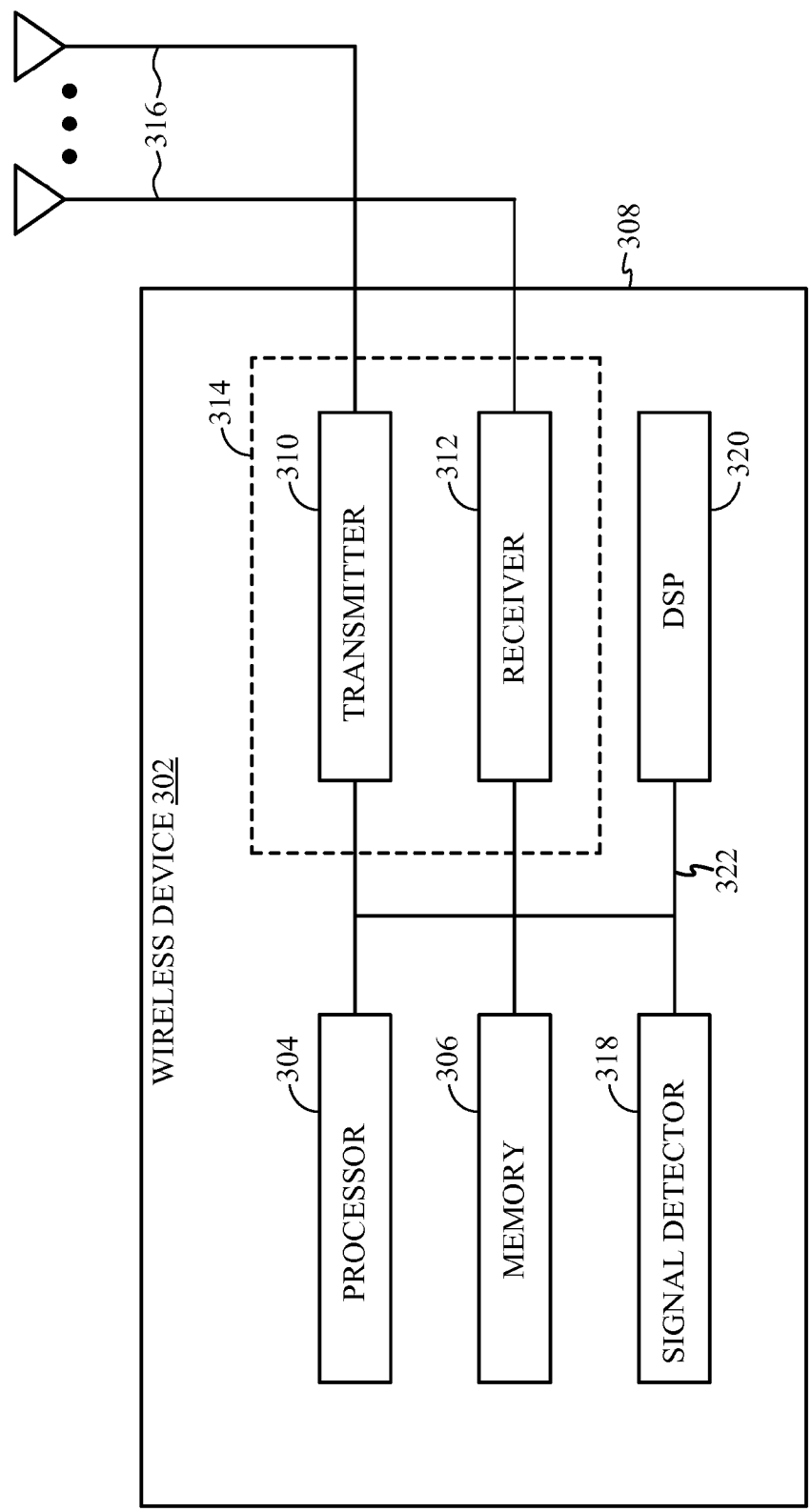
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Beacon (or Other Transmission Time Interval) Indication TWT

As noted above, aspects of the present disclosure provide techniques that may help protect transmitted beacons, from interfering transmissions from other devices, by avoiding the scheduling of beacon transmission time intervals that overlap. In some cases, the techniques may be applied in systems that utilize target wakeup times (TWTs) to allow certain stations to power down certain radio functions to reduce power consumption.

In such cases, a station (STA or other type wireless device) may send a request to an AP (or other type wireless device) for a TWT (a TWT request) in which it can access a channel. In response, the AP may indicate, via a response to the TWT request (a TWT response), a time at which the STA is allowed to start to access the channel. The STA may keep certain radio functions disabled until the time indicated by the TWT. The STA may then wake up (and enable radio functions) at its TWT to access the channel.

The use of TWTs may be particularly useful in cases where STAs transmit or receive data infrequently and/or where STAs transmit or receive only small amounts of data. As an example, in a system utilizing relays, a station acting as a relay device may request a TWT, allowing it to power down until it has data to transmit to (or data to receive from) one or more stations that it serves.

In such systems, relay stations may need to send beacon frames (or simply beacons) to provide information about the network to stations within its service range. Such beacons are typically transmitted periodically (e.g., by APs or relays) to announce the presence of a Wireless LAN.

Unfortunately, in a multi-hop scenario (where transmissions are relayed by one or more intermediate devices), the beacons of relays may not be protected from transmissions from other relays or by transmission from stations served by those other relays. This may be considered a type of "hidden node" problem as the presence of relays and stations served thereby may be known to a parent node (e.g., an AP) but hidden from other relays. This may cause beacon delay or overlapping of scheduled beacon transmission intervals with the beacons of other relays.

Aspects of the present disclosure provide mechanisms that may help prevent this scenario. In some cases, a wireless device (e.g., a relay) may provide another wireless device (e.g., a parent node of the relay) an indication of a transmission interval (e.g., a beacon transmission interval) during which access to a transmission medium (channel) by other devices should be restricted, essentially requesting that the parent node establish what is commonly referred to as a restricted access window (RAW)-during which certain devices are restricted from transmitting on the medium.

As an example, a relay station may provide an indication in a TWT request of the beacon interval of the relay. In some cases, upon association, the relay may send a TWT request with that indication to let its parent node (e.g., an AP or other relay) know about its beacon. In response, the parent node may propagate this information in the network, in order to establish a restricted access window (RAW) to protect the transmission interval of the requesting relay from transmissions by other relays or their associated STAs. In some cases, the parent node may use this information to schedule transmission of other relays in a manner that avoids collisions.

In some cases, an existing definition of a TWT request may be modified to indicate that the corresponding time is (only) for the purpose of a Beacon transmission. As a result, one or more fields in the existing definition of the TWT request may be removed for optimization. In some cases, the indication (that the TWT request is for a Beacon transmission) may be provided by one or more bits in a TWT control frame. This may serve as a strong indication that the parent node should grant the TWT request and establish the requested RAW, since the TWT is for a beacon transmission.

Figure 4:
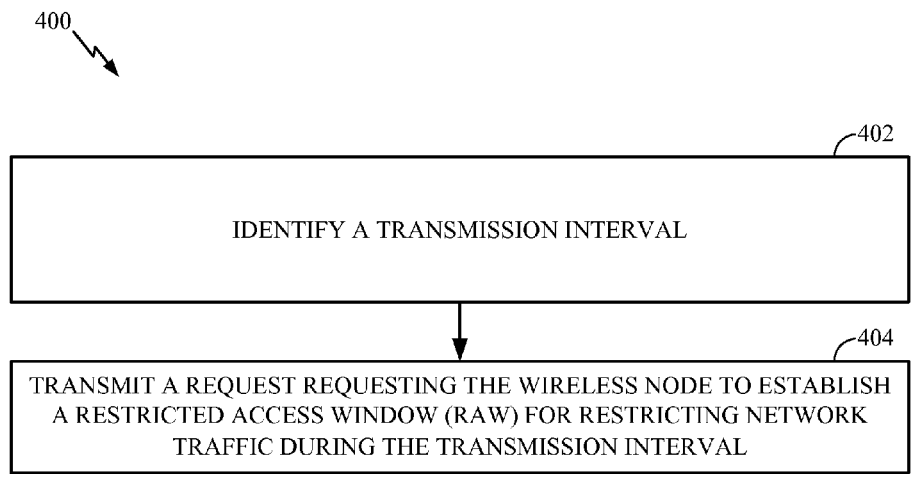
FIG. 4 illustrates a block diagram of example operations for wireless communications, for example, by a wireless device acting as a relay or some other type device, in accordance with certain aspects of the present disclosure.

FIG. 4 is a block diagram of example operations 400 for indicating a transmission interval to be protected, in accordance with aspects of the present disclosure. The operations 400 may be performed by an apparatus, such as a relay or other type wireless device.

At 402, the apparatus identifies a transmission interval. For example, the apparatus may identify a transmission time interval, such as a beacon transmission interval, during which transmissions from the apparatus may be in need of protection from transmissions from other wireless devices (e.g., other relays or the stations those relays serve).

At 404, the apparatus transmits a request for a parent node to establish a restricted access window (RAW) to restrict network traffic during the transmission interval.

Figure 5:
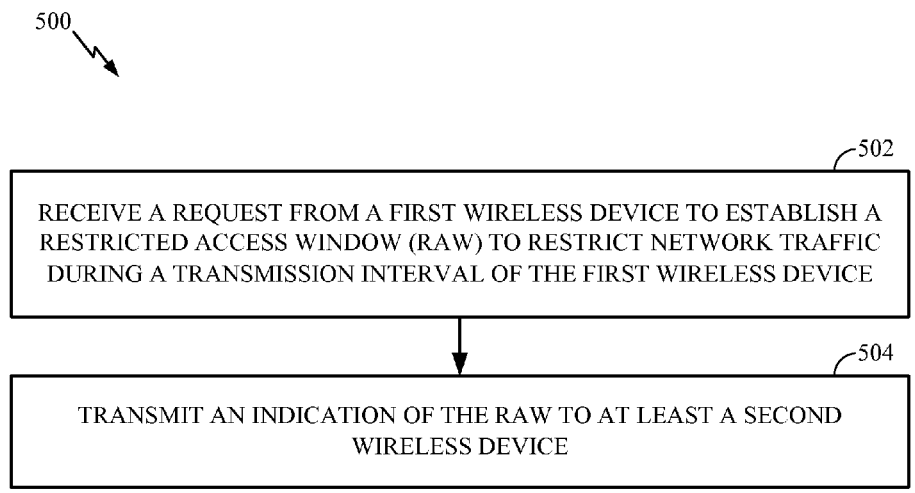
FIG. 5 illustrates a block diagram of example operations for wireless communications, for example, by an access point some other type device, in accordance with certain aspects of the present disclosure.

FIG. 5 is a block diagram of example operations 500 for establishing a RAW to protect a transmission interval of a relay, in accordance with aspects of the present disclosure. The operations 500 may be performed by an apparatus, such as an access point or other type wireless device (e.g., another type of parent node or a relay requesting the RAW).

At 502, the apparatus receives a request from a first wireless device to establish a restricted access window (RAW) to restrict network traffic during a transmission interval of the first wireless device. At 504, the apparatus signals an indication of the RAW to at least a second wireless device.

As noted above, in some cases a relay may signal a RAW request via a target wakeup time (TWT) request. Such a TWT request may include at least one bit indicating the TWT request signals a request for the parent node to establish the RAW to restrict network traffic during the transmission interval. The parent node may send a response to the TWT request including at least one bit indicating whether or not the request is granted.

As a result, the relay may transmit a beacon during the transmission interval with some assurance the beacon is protected, for example, assuming the RAW request is granted or if the parent node explicitly signals the request is granted as noted above.

In some cases, a relay device may identify (e.g., by network listening) at least one relay that is serving wireless devices whose transmissions potentially overlap with the transmission interval. In such cases, the relay device may provide an (explicit) indication of the at least one relay with the request (e.g., via a MAC ID).

The parent node may, thus, take action to ensure the identified relay receives an indication of the RAW (e.g., via a beacon transmission that indicates the relay requesting the RAW is allowed to access the channel during the RAW). The parent node may also use the information received in the RAW request to schedule the transmission times of the requesting relay and potentially interfering relay, in a manner that avoids collisions.

Figure 6:
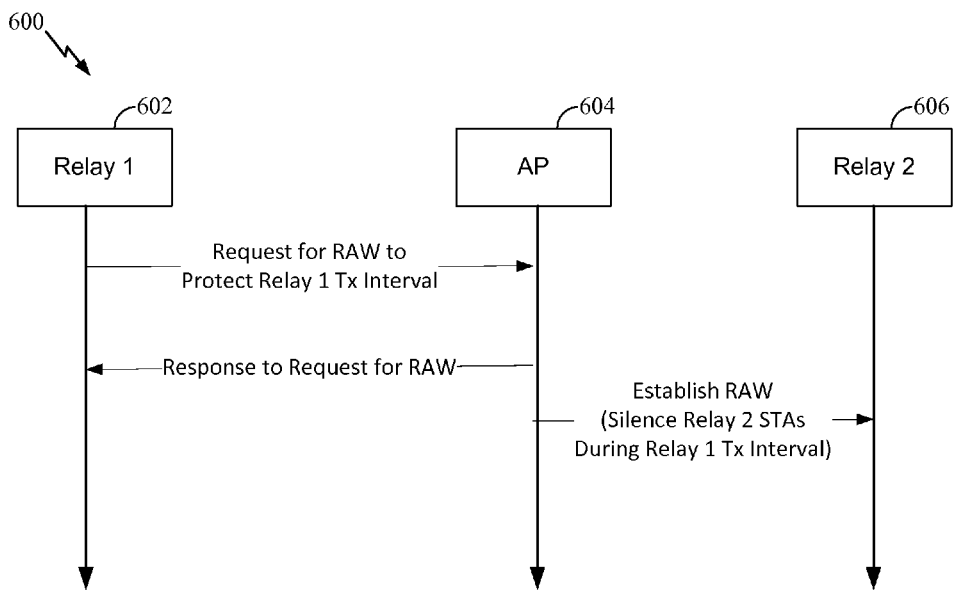
FIG. 6 illustrates an example exchange of messages between relay stations and an access point, in accordance with aspects of the present disclosure.

FIG. 6 illustrates an example exchange of messages between a first relay (Relay 1 602) requesting a RAW and a parent node (AP 604), in accordance with aspects of the present disclosure.

In the illustrated example, Relay 1 602 sends a request for RAW to AP 604 to protect a transmission interval. As illustrated, the AP 604 may send Relay 1 602 a response and also establish a RAW, for example, to silence transmissions of a second relay device (Relay 2 606), or stations served thereby, during the transmission interval indicated by Relay 1 602 in the RAW request.

Figure 7:
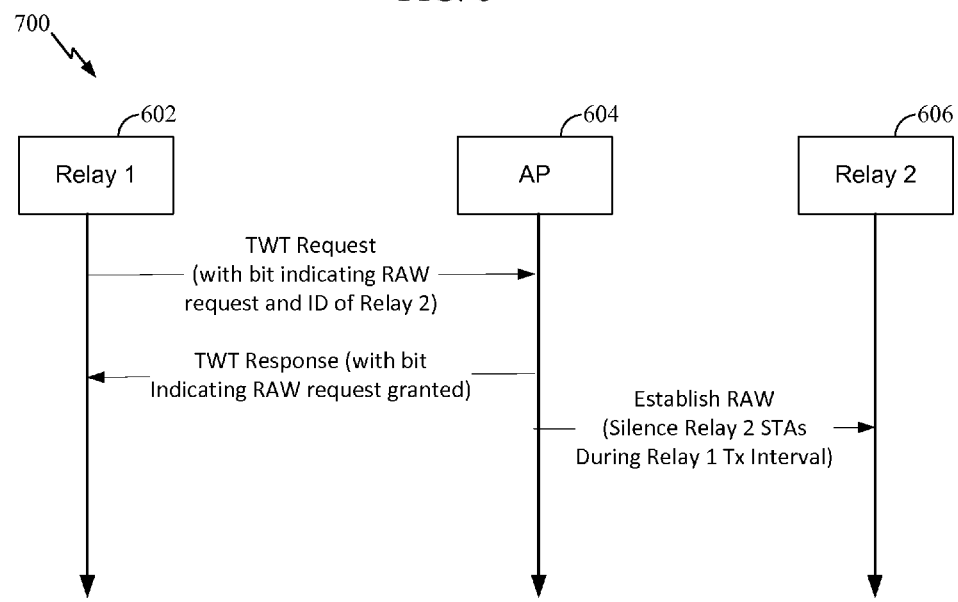
FIG. 7 illustrates an example exchange of messages between relay stations and an access point, in accordance with aspects of the present disclosure.

As illustrated in FIG. 7, a RAW request sent by Relay 1 602 may have one or more bits indicating the TWT request conveys a RAW request (e.g., to protect a beacon transmission). In response, the AP 604 sends a TWT response with one or more bits indicating the RAW request is granted. In this example, the TWT request explicitly identifies Relay 2 606, therefore, the AP 604 establishes a RAW to silence Relay 2 606 (and stations served thereby) during the Tx interval identified by Relay 1 602 in the TWT request.

Figure 4A:
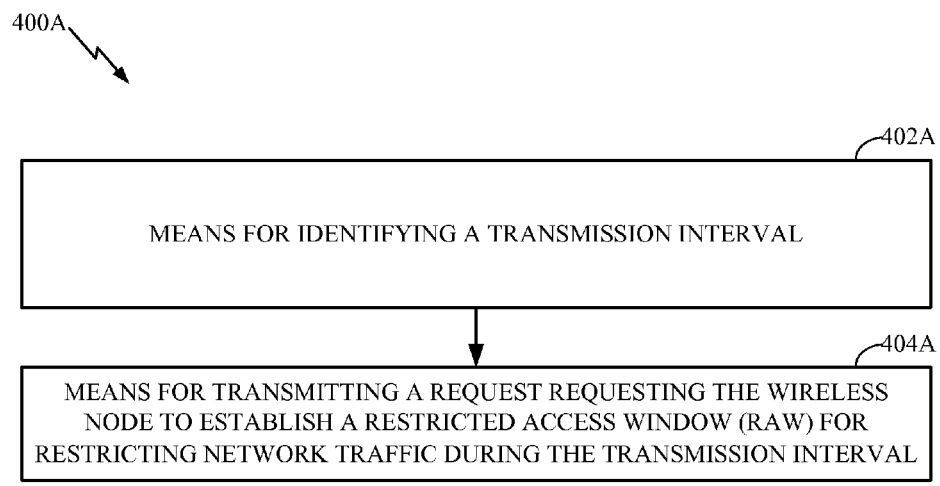
FIG. 4A illustrates example means capable of performing the operations shown in FIG. 4.
Figure 5A:
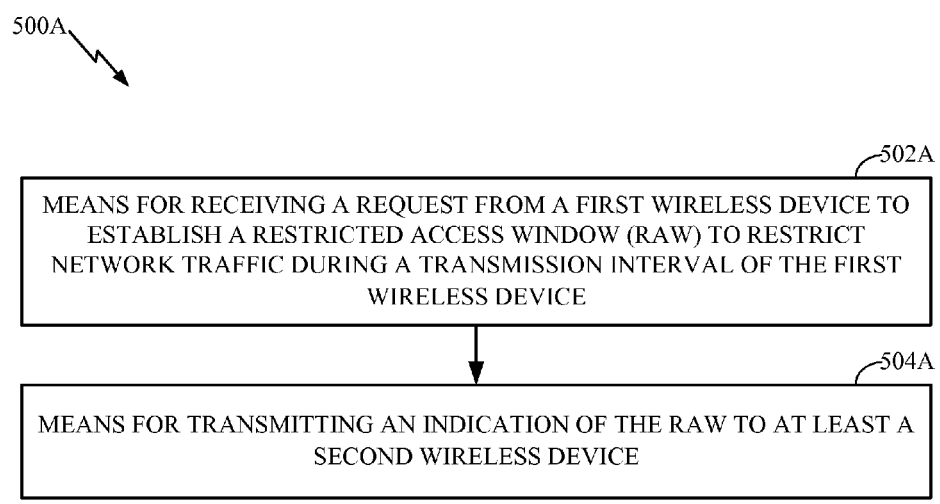
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 and 500 illustrated in FIGS. 4 and 5 correspond to means 400A and 500A illustrated in FIGS. 4A and 5A, respectively.

For example, means for transmitting or signaling may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for identifying, means for receiving, and/or means for signaling may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

Further, in some cases, rather than actually transmit a request or response (or other type transmission), an entity (e.g., a processor) may output such a message via a transmit interface to another entity (e.g., an RF front end or modem) for transmission. Similarly, rather than actually receive a request or response (or other type transmission), an entity (e.g., a processor) may receive such a message from another entity (e.g., from an RF front end or modem) via a receive interface. For example, the receive interface may include a bus interface or other type interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a processing system configured to identify a transmission interval; and
an interface configured to output for transmission a request to a wireless node requesting the wireless node to establish a restricted access window (RAW) for restricting network traffic during the transmission interval.

2. The apparatus of claim 1, wherein the request comprises a target wakeup time (TWT) request.

3. The apparatus of claim 2, wherein the TWT request comprises at least one bit indicating the request to establish the RAW.

4. The apparatus of claim 1, wherein the interface is further configured to output for transmission a beacon during the transmission interval.

5. The apparatus of claim 1, wherein the processing system is configured to identify traffic of at least one wireless device that would overlap with the transmission interval.

6. The apparatus of claim 5, wherein the processing system is configured to provide an indication of the at least one wireless device with the request.

7. The apparatus of claim 6, wherein the indication comprises at least one MAC ID.

8. The apparatus of claim 1, further comprising:
at least one antenna via which the interface transmits the request, wherein the apparatus is configured as a wireless station.

9. An apparatus for wireless communications, comprising:
a first interface configured to obtain a request from a first wireless device to establish a restricted access window (RAW) to restrict network traffic during a transmission interval of the first wireless device; and
a second interface configured to output for transmission an indication of the RAW.

10. The apparatus of claim 9, wherein the request is obtained via a target wakeup time (TWT) request.

11. The apparatus of claim 10, wherein the TWT request comprises at least one bit indicating the TWT request signals the request for the apparatus to establish the RAW to restrict network traffic during the transmission interval.

12. The apparatus of claim 9, further comprising a processing system configured to identify the first wireless device as being allowed to transmit during the RAW.

13. The apparatus of claim 9, wherein the request includes an indication of at least a second wireless device whose transmission overlaps with the transmission interval of the first wireless device.

14. The apparatus of claim 13, wherein the indication comprises at least one MAC ID.

15. The apparatus of claim 9, further comprising a processing system configured to identify one or more wireless devices serving other wireless devices whose transmissions potentially overlap with the transmission interval of the first wireless device.

16. The apparatus of claim 9, further comprising:
at least one antenna via which the first interface obtains the request from the wireless device, wherein the apparatus is configured as an access point.

17. A method for wireless communications by an apparatus, comprising:
identifying a transmission interval; and
transmitting a request to a wireless node requesting the wireless node to establish a restricted access window (RAW) for restricting network traffic during the transmission interval.

18. The method of claim 17, wherein the request comprises a target wakeup time (TWT) request.

19. The method of claim 18, wherein the TWT request comprises at least one bit indicating the request to establish the RAW.

20. The method of claim 17, wherein the transmitting comprises transmitting a beacon during the transmission interval.

21. The method of claim 17, further comprising identifying traffic of at least one wireless device that would overlap with the transmission interval.

22. The method of claim 21, wherein the transmitting comprises providing an indication of the at least one wireless device with the request.

23. The method of claim 22, wherein the indication comprises at least one MAC ID.

24. A method for wireless communications by an apparatus, comprising:
receiving a request from a first wireless device to establish a restricted access window (RAW) to restrict network traffic during a transmission interval of the first wireless device; and
transmitting an indication of the RAW.

25. The method of claim 24, wherein the request is received via a target wakeup time (TWT) request.

26. The method of claim 25, wherein the TWT request comprises at least one bit indicating the TWT request signals the request for the apparatus to establish the RAW to restrict network traffic during the transmission interval.

27. The method of claim 24, further comprising identifying the first wireless device as being allowed to transmit during the RAW.

28. The method of claim 24, wherein the request includes an indication of at least a second wireless device whose transmission overlaps with the transmission interval of the first wireless device.

29. The method of claim 28, wherein the indication comprise at least one MAC ID.

30. The method of claim 24, further comprising identifying one or more wireless devices serving other wireless devices whose transmissions potentially overlap with the transmission interval of the first wireless device.

\* \* \* \* \*